Dec. 28, 1926.
C. LENHART
1,612,296
CONDENSER DEVICE FOR WATER COOLED ENGINES
Filed July 1, 1924
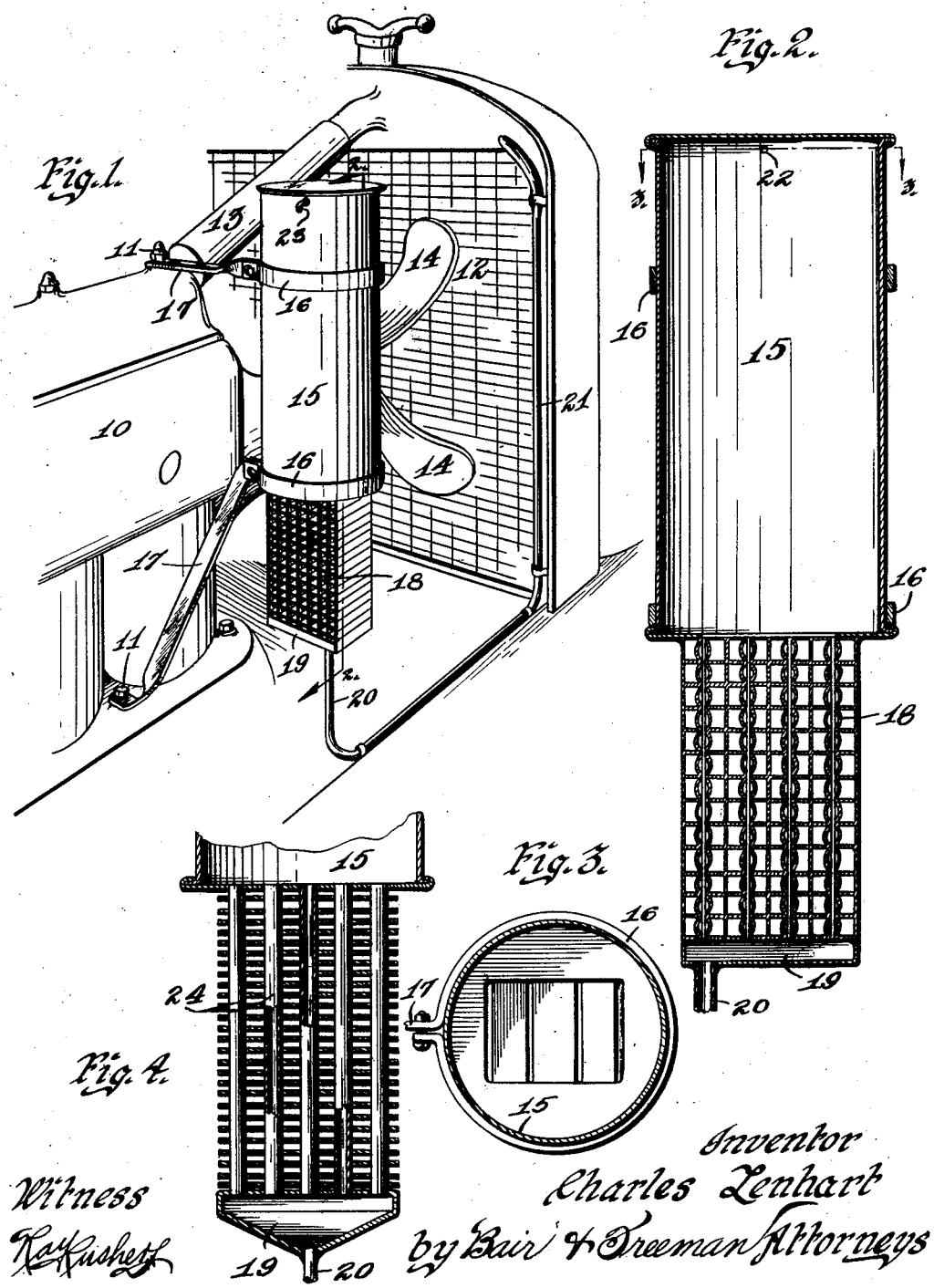
Witness
RaKushell
Inventor
Charles Lenhart
by Bair & Freeman Attorneys Patented Dec. 28, 1926.

1,612,296

UNITED STATES PATENT OFFICE.

CHARLES LENHART, OF SPENCER, IOWA, ASSIGNOR OF ONE-HALF TO L. R. JESSEN, OF SPENCER, IOWA.

CONDENSER DEVICE FOR WATER-COOLED ENGINES.

Application filed July 1, 1924. Serial No. 723,467.

The object of my invention is to provide a condenser device adapted to be used in combination with an engine having a water cooling system, including a radiator, the parts of my device being of simple, durable and comparatively inexpensive construction.

More particularly, my invention relates to a device adapted to be supported upon the automobile engine or any other type of engine having a water cooling system, by any suitable connections, and to be concealed under the hood thereof and so positioned as to take care of any of the overflow water of the radiator and then upon the cooling of the radiator of the automobile to permit the water to pass from the condenser device back into the radiator for circulation through the automobile.

Still a further object is to provide a condenser device positioned just rearwardly of the fan of the automobile so that the hot water or steam passing through the condenser device will be cooled and stored in a tank until the vacuum created by the cooling of the automobile engine will draw the water from the tank back through the condenser and into the automobile radiator for circulation.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a portion of an automobile engine and the radiator thereof, with my improved condenser device installed thereon and in communication with the automobile radiator.

Figure 2 is a central, vertical, sectional view taken on line 2—2 of Figure 1.

Figure 3 is a horizontal, sectional view taken on line 3—3 of Figure 2; and

Figure 4 is a sectional view through the condenser portion of the device showing a tubular type condenser or radiator.

In the accompanying drawings, I have used the reference numeral 10 to indicate generally an automobile engine, which includes ordinary machine bolts 11 for supporting portions of the engine in proper position.

The engine 10 is a water cooled engine, and therefore a radiator 12 is provided which is in communication with the engine 10 by means of a tubular connection 13. There is also a connection near the base of the radiator and engine which is of ordinary construction and not shown in the drawings.

It may be here mentioned that while I have illustrated an automobile engine, it is not my intention to limit the use of my structure to that particular type of engine, but it can be successfully used upon any type of engine that is water cooled.

A fan 14 is interposed between the radiator 12 and the engine 10, and the parts just described are of the ordinary construction.

My improved condenser consists of a tank 15 having a pair of clamping bands 16 extending therearound and connected to strap irons 17 which have their free ends connected to the engine 10 by means of the bolts or machine screws 11.

The tank 15 is positioned just rearwardly of the fan 14 so that the cold air drawn through the radiator 12 by the fan 14 will circulate around the condenser device, as will more fully appear. The tank 15 has fixed to its underside, a condenser 18 of any suitable type. In Figure 2 of the drawings I have shown the condenser as a cellular ribbon type.

The lower portion of the condenser 18 communicates with a receptacle 19 having a pipe connection 20 secured thereto.

The pipe connection 20 is connected to the overflow pipe 21 of the radiator 12 by any suitable fittings.

The tank 15 includes a vent opening 22 formed near its upper end and has a discharge pipe 23 extended outwardly therefrom, which is in communication with the vent opening 22.

In Figure 4 of the drawings, I have shown a tubular type condenser 24 which serves as a means of communication between the tank 15 and the receptacle 19 of the entire device.

In this connection, it may be mentioned that any suitable type of condenser 18 may be used and it is not my intention to limit myself to the particular types of condenser shown in the accompanying drawings.

*Practical operation.*

In the practical operation of my condenser device, it is mounted upon the engine of the automobile and the pipe 20 is connected with the overflow pipe 21 of the radiator.

Water from the cooling system, when it becomes heated would ordinarily pass out through the overflow pipe and be discharged, and in my device, the water or steam passes into receptacles 19, and as additional heated water or steam passes into the receptacle 19, it will cause the water to pass into the condenser 18 and into the tank 15.

The tank 15 serves as a storage tank for taking care of the supply of water that would ordinarily be discharged upon the heating of the engine and the radiator therefor.

Air from the tank 15 is permitted to be discharged through the vent opening 22.

When the automobile is stopped and the radiator is then given an opportunity to cool, it will cause a vacuum to be formed which will draw the water through the tank 15, through the condenser 18, pipes 20 and 21, back into the radiator 12.

The air passing through the goose neck 23 and the vent opening 22 permits the vacuum formed by the cooling of the water in the radiator 12 to draw the water from the storage tank 15 into the radiator 12.

The advantage of my structure resides in the fact that it is not necessary to replenish the water supply in the radiator very often due to the fact that the water, which would otherwise be discharged, is caught and used again.

Some changes may be made in the construction and arrangement of the various parts of my invention, without departing from the real spirit and purpose of my invention and it is my intention to cover by my claim any modified forms of structure or use of mechanical equivalents, which may be reasonably included within their scope.

I claim as my invention:

In combination with a radiator, an attachment for condensing the steam arising from the water therein comprising a tank, a receptacle, a condenser between the tank and receptacle, said tank being positioned above the condenser, a pipe connection between the overflow pipe of the radiator and the receptacle as and for the purposes stated.

CHARLES LENHART.